J. T. HIMMEGER.
Horse-Detacher.
No. 196,579.  Patented Oct. 30, 1877.
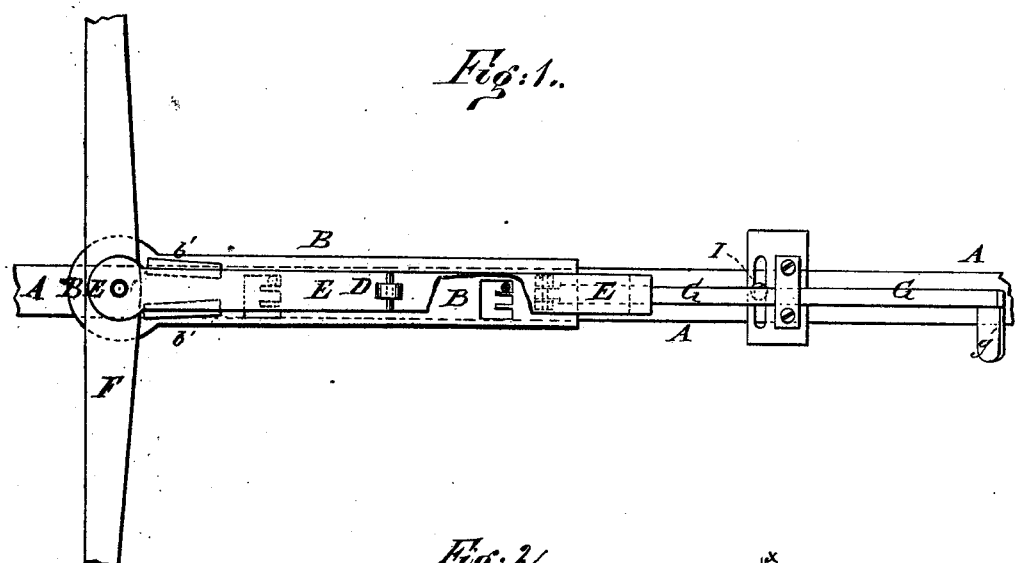
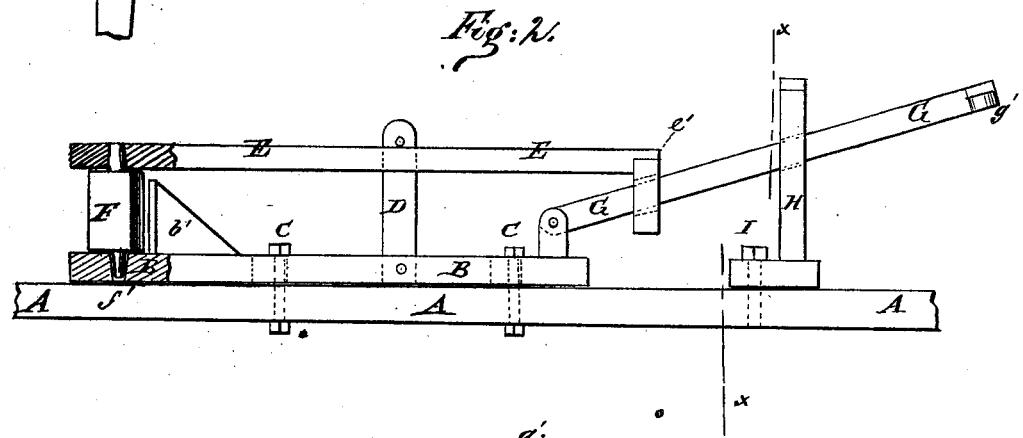
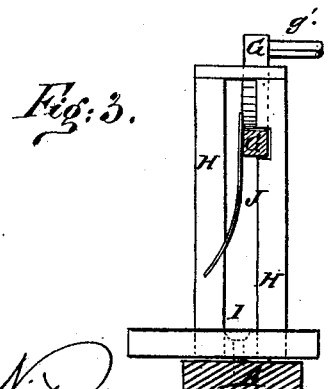
WITNESSES:
INVENTOR:
J. T. Himmeger
BY
ATTORNEYS.

UNITED STATES PATENT OFFICE.

JOSEPH T. HIMMEGER, OF LA RUE, OHIO.

IMPROVEMENT IN HORSE-DETACHERS.

Specification forming part of Letters Patent No. 196,579, dated October 30, 1877; application filed September 14, 1877.

*To all whom it may concern:*

Be it known that I, JOSEPH T. HIMMEGER, of La Rue, in the county of Marion and State of Ohio, have invented a new and useful Improvement in Clevises, of which the following is a specification:

Figure 1 is a top view of my improved clevis, part being broken away to show the construction. Fig. 2 is a side view of the same, part being broken away to show the construction. Fig. 3 is a detail cross-section taken through the broken line $x\ x$, Fig. 2.

Similar letters of reference indicate corresponding parts.

The object of this invention is to furnish an improved clevis for connecting a mower, reaper, wagon, or other draft, to the horses, which shall be so constructed as to enable the horses to be instantly detached should they become frightened or otherwise unmanageable, and which shall be simple in construction, and convenient and reliable in use.

The invention consists in the combination of the lower bar, whether made with or without the notched slots, the standard, the pivoted upper bar, the lever, and the slotted standard, provided with the spring, with each other, and with the double-tree provided with the pin or bolt, having projecting ends, as hereinafter fully described.

A represents the tongue, to which the draft is to be applied. B is the lower or base bar of the clevis, which is designed to be secured to the tongue A by two bolts, C, passing through the said tongue A, and through the said bar B.

If desired, the bar B may have cross-slots, with short longitudinal slots or notches leading from their rear side, formed in it, to receive the bolts C, so that the clevis may be adjusted laterally to regulate the side draft, by loosening the nuts of the bolts C, without its being necessary to remove the said bolts.

To the middle part of the bar B is attached the lower end of a short standard, D, to the upper end of which is hinged the middle part of the upper or top bar E of the clevis.

The forward ends of the bars B and E have holes formed in them to receive the pin or bolt $f'$, attached to the center of the double-tree F, as shown in Fig. 2.

$b'\ b'$ are triangular stop-blocks attached to the lower bar B, a little in the rear of the double-tree F, to limit its play. Upon the rear end of the upper bar E is formed, or to it is attached, a downwardly-projecting arm, $e'$, through which is formed a slot to receive the lever G. The forward end of the lever G is pivoted to the rear end of the lower bar B, or to a short stud attached to said end. The lever G passes back through the slot of the standard H, the base of which is slotted to receive the bolt I, by which it is secured to the tongue A, so that the said standard may be adjusted to correspond with the lateral adjustment of bar B.

By this construction, by raising the rear end of the lever G, the forward end of the top bar E will be lowered upon the double-tree F, and by lowering the rear end of the lever G the forward end of the top bar E will be raised, releasing the double-tree F, and allowing it to be drawn out by the horses.

The lever G is supported in place, when raised, by entering a notch in the standard H, at the side of the upper part of its slot, where it is held by a spring, J, attached to the standard H at the other side of its slot.

To the rear end of the lever G is attached a foot-rest, $g'$, to enable the driver to readily push the said lever from its notch with his foot, and thus disconnect the horses in an instant.

Having thus described my invention, I claim as new and desire to secure by Letters Patent—

The combination of the lower bar B, whether made with or without the notched slots, the standard D, the pivoted upper bar E, the lever G, and the slotted standard H, provided with the spring J, with each other and with the double-tree F, provided with the pin or bolt $f'$, having projecting ends, substantially as herein shown and described.

JOSEPH T. HIMMEGER.

Witnesses:
W. J. CAMPBELL,
GEO. ALFRED FLEMING.